United States Patent
Parizat et al.

(10) Patent No.: US 10,988,590 B2
(45) Date of Patent: Apr. 27, 2021

(54) HIGHLY TRANSPARENT COATED CELLULOSE TRIACETATE FILM AND DISSOLVER MEDIUM

(71) Applicant: ISLAND POLYMER INDUSTRIES GMBH, Bitterfeld-Wolfen (DE)

(72) Inventors: Amnon Parizat, Old Westbury, NY (US); Gernod Haerter, Bitterfeld-Wolfen (DE); Silvio Boettcher, Leipzig (DE); Anne Pils, Leipzig (DE); Elena Ostas, Halle (DE)

(73) Assignee: Island Polymer Industries GmbH, Bitterfeld-Wolfen (DE)

( * ) Notice: Subject to any disclaimer, the term of this patent is extended or adjusted under 35 U.S.C. 154(b) by 0 days.

(21) Appl. No.: 15/852,262

(22) PCT Filed: Jun. 17, 2016

(86) PCT No.: PCT/DE2016/000254
§ 371 (c)(1),
(2) Date: Dec. 22, 2017

(87) PCT Pub. No.: WO2016/206672
PCT Pub. Date: Dec. 29, 2016

(65) Prior Publication Data
US 2018/0194913 A1    Jul. 12, 2018

(30) Foreign Application Priority Data
Jun. 23, 2015   (DE) .................. 10 2015 008 336.8

(51) Int. Cl.
| | |
|---|---|
| C08J 7/04 | (2020.01) |
| G02B 21/34 | (2006.01) |
| C09D 101/14 | (2006.01) |
| C08J 5/12 | (2006.01) |
| C08L 1/12 | (2006.01) |
| C09D 4/00 | (2006.01) |
| C09D 9/00 | (2006.01) |
| G01N 1/36 | (2006.01) |
| C09D 133/06 | (2006.01) |

(52) U.S. Cl.
CPC .............. *C08J 7/042* (2013.01); *C08J 5/122* (2013.01); *C08J 7/0427* (2020.01); *C08L 1/12* (2013.01); *C09D 4/00* (2013.01); *C09D 9/005* (2013.01); *C09D 101/14* (2013.01); *G01N 1/36* (2013.01); *G02B 21/34* (2013.01); *C08J 2301/08* (2013.01); *C08J 2301/12* (2013.01); *C08J 2401/12* (2013.01); *C08J 2433/08* (2013.01); *C09D 133/06* (2013.01); *G01N 2001/362* (2013.01); *G01N 2001/364* (2013.01)

(58) Field of Classification Search
CPC ............................... C08J 7/042; C08J 7/0427
See application file for complete search history.

(56) References Cited

U.S. PATENT DOCUMENTS

| | | | | |
|---|---|---|---|---|
| 4,407,990 A * | 10/1983 | Hall | ..................... | C09D 4/06 427/142 |
| 4,853,262 A | 8/1989 | Horie et al. | | |
| 5,279,659 A * | 1/1994 | Nishiura | ................... | C08K 5/12 106/170.15 |
| 6,589,650 B1 * | 7/2003 | Govek | ....................... | C08F 2/44 428/355 AC |
| 6,842,288 B1 * | 1/2005 | Liu | ......................... | G02B 1/111 359/582 |
| 6,913,902 B2 * | 7/2005 | Kieftenbeld | ............. | C08J 3/092 428/355 AC |
| 8,039,531 B2 * | 10/2011 | Shelton | ...................... | C08B 3/16 524/35 |
| 2003/0215608 A1 * | 11/2003 | Bermel | ................... | B29C 41/12 428/141 |
| 2006/0105155 A1 * | 5/2006 | Ikeyama | ............... | G02B 5/0226 428/220 |
| 2007/0258940 A1 * | 11/2007 | Hamilton | ............. | C09D 5/1662 424/78.09 |
| 2012/0082855 A1 | 4/2012 | Ohta et al. | | |
| 2014/0018280 A1 * | 1/2014 | Akhtar | ................... | C09D 5/008 510/242 |

FOREIGN PATENT DOCUMENTS

| | | |
|---|---|---|
| JP | 3975036 B2 * | 9/2007 |
| WO | WO 99/53357 | 10/1999 |
| WO | WO 02/12857 A1 | 2/2002 |

OTHER PUBLICATIONS

Malm—Properties of Celllulose esters—Ind.Eng.Chem. 34 (1942) 430-435 (Year: 1942).*

(Continued)

*Primary Examiner* — Callie E Shosho
*Assistant Examiner* — John Vincent Lawler
(74) *Attorney, Agent, or Firm* — Ursula B. Day

(57) ABSTRACT

A coated, highly transparent film based on cellulose triacetate, is proposed that includes a) a support film acting as support layer and a cellulose triacetate or a mixture of cellulose esters and cellulose triacetate as main component, the cellulose triacetate or mixture being defined by a haze value of <0.5%, measured on the cellulose triacetate or mixture drawn out to a film after having been dissolved in dichloromethane or acetone, and b) a multi-functional coating applied in a coating solution to one or both sides of the support film. A dissolver medium can also be used as an enclosure medium. The highly transparent films of the invention can be used as window film, sunglasses film, laminating film, furniture foil, enclosing film, slide film for microscopy, cover slip replacement film and/or protective film, adhesive to glass, wood, metal, ceramic, cellulose derivative films or plastics following incipient dissolution or heat treatment.

12 Claims, No Drawings

(56) References Cited

OTHER PUBLICATIONS

Nakamura—JP 3975036 B2—MT—embossing to make antireflective film—2007 (Year: 2007).*
Acrylic Chemical Compatibility Chart _ TDI International, Inc_ (Year: 2018).*
Diethylene glycol monobutyl ether _ C8H18O3—PubChem (Year: 2018).*
Ethanol _ CH3CH2OH—PubChem (Year: 2018).*
Ethyl Acetate—High Purity Solvents _ Sigma-Aldrich (Year: 2018).*
NIST—Phosphoric acid, trimethyl ester—Prop.Data (Year: 2018).*
Methyl acetate _ CH3COOCH3—PubChem (Year: 2018).*
Filmetrics—refractive index of acrylate—Screenshot—2018 (Year: 2018).*
Fox equation—Polymer properties database—2018 (Year: 2018).*
Glass transition temperature for homopolymers—Sigma-Aldrich—2018 (Year: 2018).*
Hiroaki Sata et al: "5.4 Properties and applications of cellulose triacetate film", Macromolecular Symposia, vol. 208, No. 1, (Mar. 1, 2004), pp. 323-334, XPO55102021, ISSN: 1022-1360, DOI: 10.1002/masy.200450413 p. 328; table 1.
Horaki Sata et al.: "Properties and Applications of Cellulose Triacetate Film", Macromolecular Symposia, vol. 208, No. 1, Mar. 1, 2004.

* cited by examiner

HIGHLY TRANSPARENT COATED CELLULOSE TRIACETATE FILM AND DISSOLVER MEDIUM

CROSS-REFERENCES TO RELATED APPLICATIONS

This application is the U.S. National Stage of International Application No. PCT/DE2016/000254, filed Jun. 17, 2016, which designated the United States and has been published as International Publication. No. WO 2016/206672 A1 and which claims the priority of German Patent Application, Serial No. 10 2015 008 336.8, filed Jun. 23, 2015, pursuant to 35 U.S.C. 119(a)-(d) the description of which is hereby incorporated by reference.

BACKGROUND OF THE INVENTION

The invention relates to a highly transparent film based on cellulose triacetate (CTA), which exhibits, due to a multifunctional coating, both an improved adhesion to surfaces of glass, wood, ceramic, metal and plastic provides by virtue of the coating itself a preserving and protective function for materials that can be embedded in the coating matrix.

The invention further relates to a solvent mixture suitable as a dissolver medium for dissolving the multifunctional coating, in particular for bonding the films to surfaces of glass, wood, ceramic, metal and plastic. Dissolution is to be understood as the conversion of a previously solid coating layer into a highly viscous state by the action of one or more solvents.

Films based on cellulose derivatives have been produced for more than 100 years. They are also used as substrates for photographic active layers, as support material for membranes or—especially in the last 10 years—as optically inert protective material for (LCD) crystal layers of liquid crystal displays and polarizing layers in LCD screens. Cellulose esters such as cellulose triacetate (CTA), diacetate cellulose (DAC), cellulose acetate butyrate (CAB) or cellulose acetate propionate (CAP) or combinations of these cellulose derivatives are used here as preferred materials.

Since the beginning of the second millennium, films based on cellulose triacetate have also been used as a component of protective films, sunglasses, ski goggles, safety goggles and specialty goggles.

Usually, different films having different thickness and functionality are hereby bonded together, wherein the surface of the cellulose triacetate film must be chemically modified (saponified) to improve the bonding properties.

The CTA films used for this purpose are produced with a comparatively complex casting process, which is based essentially on the process steps of dissolution, filtration, degassing, application and drying, wherein each film manufacturer follows a specific, individually developed production process.

By adding additives, the properties of the product can be modified or optimized, such as, for example, UV resistance, thermal resistance, stretching properties, transmission, absorption properties or blocking properties, in accordance with the required customer specifications.

Furthermore, a functional coating is frequently also applied on one or both sides of the film surface in order to achieve improved antistatic properties or, for example, improved sliding behavior. This procedure is mainly used in the production of film rolls for photographic films.

Depending on the respective properties, CTA films are offered as UV protective film, hardened film, colored film, retardation film, PVA protective film, thermally stable intermediate layer film, black-and-white film base or color film base. For the production of end products, such as LCD screens or sun glasses, the bonding of different functional films is always required to obtain the best possible property profile.

Bonding is also required if use of CTA films is desired, for example, as protective window films (IR films, UV films, etc.) or as protective films for furniture board or as furniture function films.

The use of water-based adhesives is problematic because the CTA film surface has an inadequate contact angle and can be difficult to wet. In addition, CTA tends to absorb water which leads to deformation.

An alternative is offered by solvent-based adhesives, that is, adhesives based on non-aqueous solvents, which are also problematic because the film surface is usually excessively affected and the optical quality of the film at the interface greatly deteriorates. Solvent residues usually remain in the interface layer for a very long time and only diffuse very slowly out of the matrix, which may under certain conditions also lead to long-term deformations of the composite.

In addition, many of the adhesives available on the market have a refractive index different from CTA and thus tend to impair the optical parameters of the composite and even cause diffraction spectra or the appearance of a streaky overall appearance of the transparent bonding area at the interfaces.

Another disadvantage is the often very complex production and application process for the adhesion-promoting coatings of CTA films and the restriction to special applications.

A typical application for adhesion-promoting layers on CTA films is, for example, the use as a cover film in microscopy, as described, for example, in the publications U.S. Pat. No. 4,852,262 A, EP 1 070 273 A1 or WO 2002012857 A1.

The use is here limited exclusively to microscopy, and leaves out completely the multifunctional usability of the described films as window film, light protection film or as a furniture film.

Data on haze values and maximum achievable transmission values in the UV and visible range are not disclosed here, although these are essential valuation variables especially for transmitted-light applications under the influence of solar radiation.

When searching for a highly transparent, visually inconspicuous adhesive material for bonding cellulose triacetate films to one another and also to other support materials such as glass, wood, metal, polymethylmethacrylate (PMMA) and others, it has surprisingly been found that an adhesive-like layer can be obtained by using a coating solution consisting of a solvent or solvent mixture, an acrylate copolymer, a cellulose derivative and a plasticizer, which makes it feasible to obtain, both by heating as well as by minimal use of a solvent, a good bondability of the CTA film with glass surfaces, plastic surfaces, wood and other CTA films. This coating is highly transparent and has almost the same refractive index as cellulose triacetate.

Further tests have shown that the long-term adhesion behavior can be improved by modifying the CTA film surface with a thin adhesion layer. By optimizing and combining various additives, it is also possible to increase the operating temperature to 95° C. for certain applications.

Another advantage is the multifunctional use of such coated CTA films for applications with windows, sunglasses, in microscopy or in the furniture sector, wherein if necessary aromatic solvents for dissolution of the adhesive layer can be completely eliminated. It is hereby already sufficient to use specially developed ethanol-containing ether solutions or ethanol-containing carboxylic ester solutions which exhibit significantly lower toxicity than aromatics.

SUMMARY OF THE INVENTION

It is the object of the invention to significantly expand the field of applications of these CTA films by improving the adhesion by producing and applying a very simple multifunctional coating solution that can be universally used with specially adapted CTA films and to enable by using a single film or a combination of these films applications as a window film, a cover film, a film for sunglasses, a furniture film, a protective film or as a preservative film for sensitive surfaces.

Moreover, bonding should be made possible both by using solvents or solvent mixtures with the lowest possible toxicity as well as directly by thermally assisted pressing processes.

A simplified combination of these films for the production of laminates and composite systems should also be made possible by applying this adhesive coating to multifunctional CIA films with, for example, an UV or IR light-absorbing function or a defined color.

The object of the invention is achieved by a highly transparent film based on cellulose triacetate according to the invention includes:

a) a support film acting as a support layer which contains cellulose triacetate or a mixture of cellulose esters and cellulose triacetate as a primary component, wherein the cellulose triacetate or the mixture has a high purity and quality, which is defined by a haze value of <0.5%, as measured on the cellulose triacetate or mixture drawn to a film and previously dissolved in dichloromethane or acetone, with a layer thickness of 100 µm, and b) a multifunctional coating applied on one side or both sides of the support film in a coating solution and comprising the following components:

$b_1$) one or more solvents from the groups listed below:
alcohols: methanol, ethanol, propanol, butanol, hexanol;
organohalogen solvents: chloroform, dichloromethane, trichloromethane, tetrachloromethane, trichloroethane;
ethers: dimethyl ether, diethyl ether, dipropyl ether, polyether, glycol ether, tetrahydrofuran, dioxane;
esters: carboxylic esters, in particular methyl acetate, ethyl acetate, propyl acetate, butyl acetate, gamma-butyrolactone, gamma-valerolactone, carbonic acid dimethyl ester, ethyl lactate, cyclohexanol acetate,
ketones: acetone, methyl ethyl ketone, butyl methyl ketone,
aromatics: benzene, toluene, xylene, ethylbenzene,
deep eutectic solvents (DES) based on quaternary ammonium compounds and hydrogen bond donors: choline chloride/urea; choline acetate/urea; tetrabutylammonium chloride/oxalic acid; choline chloride/glycol, $b_2$) at least one acrylate copolymer having a refractive index (measured at 20° C.) between 1.30 and 1.60, an average molecular weight $M_W$ between 10,000 g/mole and 300,000 g/mole, a glass transition temperature of at least 35° C. and a good solubility or swellability in at least one solvent from the group of aromatic solvents, organohalogen solvents, esters, ethers, ketones, deep eutectic solvents or alcohols;

$b_3$) at least a single or several cellulose derivatives which are either identical to the cellulose derivative optionally used in the surface layer of the support film or have a solubility of at least 10 g/liter at least in a solvent of at least one of the following solvent groups of the haloalkanes, ketones, ethers, esters, deep eutectic solvents or alcohols, $b_4$) one or more plasticizers in a proportion of between 0.01% by mass and 15% by mass.

In this way, a highly transparent film with improved adhesive and protective properties is obtained. Conceptually, this represents a combination of a coating and specially adapted films based on cellulose triacetate.

The film substrate preferably contains $a_1$) a cellulose triacetate or a mixture of cellulose esters and cellulose triacetate as the primary component, which is defined in addition to the haze value of <0.5% by the following properties:
as raw material base: cotton linters and/or wood pulp,
a water content of <1%,
a proportion of free acetic acid of ≤300 ppm,
a proportion of gel-forming components of <0.5%,
a very slight yellow coloration, characterized by a low Hazen color number (APHA value)<70 (determined on a 16% solution of cellulose triacetate, dissolved in methylene chloride according to the ASTM D-1209 method),
a proportion of <0.5% of foreign fibers and over- or under-derivatized particles having a size of ≤40 µm, and $a_2$) at least one organic or inorganic substance, which is effective as bonding agent and spacer between the molecular chains of cellulose triacetate and acts as a plasticizer, so that this substance, in addition to an improved removability of the solvents, also causes improved flexibility and elasticity of the films, $a_3$) to improve the contact angle and/or the scratch resistance of the support film, a surface layer disposed on one side or both sides and based on a cellulose derivate or cellulose derivate mixture that is fully dissolved or initially dissolved in halogen alkanes, ketones, ethers, esters, deep eutectic solvents or alcohols and/or an acrylate mixture which is crosslinkable with UV light, chemically or by supplying thermal energy, $a_4$) optionally further functional additives from the following groups in a proportion between 0.001 mass % and 15 mass %:
organic or inorganic substances with a transmission-influencing absorptive function in the wavelength range of 300 nm to 2,500 nm,
microscale or nanoscale additives to improve adhesion, slip or electrostatic properties,
crosslinking agents,
stabilizers and/or
antioxidants.

The information about the haze value was determined according to the method ASTM D 1003, D 1044 by using the Haze measuring device "haze-gard plus (4725)" from the company BYK Gardner. The aforementioned particle sizes in the nanometer range were determined by the manufacturer using X-ray diffraction and in the micrometer range by the method of filtration using different filters with a respective exactly defined pore size, for example 20 µm, 10 µm or 5 µm.

According to a preferred embodiment of the invention, the corresponding substances selected from $a_2$) and $b_4$) and effective as plasticizer component are selected from the group of phosphoric acid esters, phthalic acid esters, carboxylic acid esters, such as citric acid ester, fatty acid ester, adipic acid ester, and/or deep eutectic solvents and/or glycols, wherein other substances having similar functionality can also be used. Preferably, these substances have a boiling point greater than 60° C.

For example triphenyl phosphate, biphenyldiphenyl phosphate, tricresyl phosphate, cresyldiphenyl phosphate, octyldiphenyl phosphate, ethylhexyldiphenyl phosphate, isodecyldiphenylphosphate, butylenebis(diethylphosphate), ethylenebis(diphenylphosphate), triethylphosphate, tri-n-butylphosphate, phenylenebis(diphenylphosphate), phenylenebis(dibutylphosphate) and/or resorcinolbis(diphenylphosphate) may be used as phosphoric acid esters.

For example, diethyl phthalate, dimethoxyethyl phthalate, dimethyl phthalate, dioctyl phthalate, dicyclohexyl phthalate, diisononyl phthalate, dibenzyl phthalate, benzylethyl phthalate, butyl benzyl phthalate, methylphthalylmethyl glycolate, ethylphthalylethyl glycolate, propylphthalylpropyl glycolate, butylphthalylbutyl glycolate and/or dicyclohexylterephthalate may be selected as phthalic acid esters.

For example, sorbitolhexylpropionate, xylitolpenta acetate, trimethyl trimellitate, triethyl trimellitate, tributyl trimellitate, diethylene glycol dibenzoate, dipropylene glycol dibenzoate, triethylene glycol-bis-(2-ethylhexanonate), tartrate, oleates, sebacates, azelates, ricinoleates, diphenylsuccinate, di-2-naphthyl-1,4-cyclohexylcarboxylate, tricyclohexyltribarbamate, tetra-3-methylphenyltetrahydrofurane-2,3,4,5-tetracarboxylate, tetra-butyl-1,2,3,4-cyclopentyltetracarboxylate, triphenyl-1,3,5-cyclohexyltricarboxylate, triphenylbenzyl-1,3,5-tetracarboxylate, triethylcitrate, acetyltrimethylcitrate, acetyltriethylcitrate, acetyltributylcitrate, dimethyladipate, dioctyldipate, dicyclohexyladipate, 2,2,4,4-tetramethylcyclobutane-1,3-dioldiacetate, 2,2-dimethyl-4,4-diethylcyclobutane-1,3-diol diisobutyrate, 2,2,4,4-tetramethylcyclobutane-1,3-diol-di-n-decanoate, 2,2,4,4-dimethylcyclobutane-1,3-diolbis(2-ethylhexanoate), octyl epoxytallate and/or 2,2,4-trimethyl-1,3-pentanediol diisobutyrate may be suitable as carbonic acid esters, including citric acid ester, fatty acid ester and adipic acid ester.

Mixtures of quaternary ammonium compounds and hydrogen bond donors, such as mixtures of choline chloride and urea, choline chloride and glycols, choline chloride and sugar, choline acetate and urea, tetrabutylammonium chloride and oxalic acid as well as deep eutectically effective compounds of halide salts and carboxylic acids are preferred as deep eutectic solvents. Deep eutectic solvents are commonly referred to by the English term "Deep eutectic solvents" (DES). Multi-component molten salts having individual components in phase equilibrium with a common melting point that is significantly below the melting points of the individual components are referred to as deep eutectic solvents. These melts are highly ionic and thus act as a solvent for metal salts, but also for cellulose.

Glycerol triacetate (triacetine), glycerin triproprionate (triprorionin), polyethylene glycol, triethylene glycol-bis-(2-ethylhexanonate), diethylene glycol dibenzoate and/or dipropylene glycol dibenzoate are preferred as glycol.

For example, polyester succinate and/or polyester adipate can be used as polyesters.

Additional substances with similar functionality are, for example, camphor, camphor anhydride or butylbenzyl sulfonamide.

Suitable as a basic coating material for the optional surface layer or contact layer according to $a_3$) are in particular cellulose acetate (CA), cellulose diacetate (CDA), cellulose triacetate (CTA), cellulose acetate butyrate (CAB) and cellulose acetate propionate (CAP). These materials may preferably be dissolved in a single solvent or in a mixture of the solvents from the group of halogen alkanes, ketones, esters, ethers, deep eutectic solvents and alcohols and applied to the film substrate either during the film manufacturing process or in conjunction with a process upstream of the actual coating process by means of a doctor blade, an applicator roll, a spray head or a slotted nozzle, wherein the layer thickness of the dry layer is at most 5 μm.

Commercially available hard coat lacquers, such as, for example "Hardcoat EC200-08" from the company Kriya Materials BV, (Geleen, Netherlands) or "SilFORT UVHC 7800" from the company Momentive Performance Materials Inc. (Leverkusen, Germany) are suitable basic coating materials according to $a_3$) for a contact layer and a hard coat layer based on a UV-, chemically or thermally crosslinkable acrylate mixture.

Preferably, materials having the following properties may be used as functional additives according to $a_4$):
UV-light absorbing materials,
IR-light absorbing materials,
visual light absorbing dyes,
nanoscale materials absorbing or reflecting light in the wavelength range of 300 nm to 2500 nm with an average particle size of ≤200 nm, which only minimally influence the haze value, i.e. with a Δhaze of ≤0.05,
photochromic dyes,
thermochromic dyes,
luminescent dyes,
microscale antiblocking or matting agents with an average particle size between 1 μm and 5 μm,
nanoscale antiblocking agents with an average particle size between 20 nm and 800 nm,
transparent materials which are effective as an antioxidant stabilizer and do not affect the haze value, and
transparent adhesion promoters and crosslinking agents.

According to the invention, the support film is provided with a multifunctional, in particular an adhesion-improving and preserving coating. The term "multifunctional" in the context of the coating describes that different properties of the film coated therewith can be produced or changed/improved by the coating while maintaining the high transparency of the support material. This refers in particular to an improvement of the adhesion properties, the suitability as an adhesive, the preservation of the support material as well as of objects embedded in the coating for protection against environmental influences, optionally a change in the scratch resistance, sliding properties and solubility by solvents in which the support material is insoluble.

The multifunctional coating is applied to the film in a solution according to one of the abovementioned coating methods and then dried, wherein the coating solution preferably contains the following components:
$b_1$) one or more of the abovementioned solvents, wherein at least one solvent is able to both dissolve the coating base material as well as to initially dissolve or swell the cellulose triacetate and has an evaporation point above 35° C.,
$b_2$) at least one acrylate copolymer having a refractive index (measured at 20° C.) between 1.30 and 1.60, an average molecular weight $M_W$ between 10,000 g/mole and 300,000 g/mole and a glass transition temperature of at least 35° C. and a good solubility or swellability in at least one solvent from the group of aromatic solvents, organohalogen solvents, esters, ethers, ketones, deep eutectic solvents or alcohols,
$b_3$) at least a single or several cellulose derivatives, which are either identical to the cellulose derivative employed in the contact layer according to point $a_3$), or which has a solubility of at least 10 g/liter at least in one solvent of the solvent groups of halogenated alkanes, ketones, ethers, esters listed below, deep eutectic solvent or alcohols, $b_4$) optionally one or more plasticizers equivalent to the plasticizers listed under point $a_2$).

According to a particularly preferred embodiment of the invention, the component $b_1$) is a solvent mixture consisting of maximally two solvents, wherein at least one solvent must have the property of being able to initially dissolve or swell cellulose triacetate, wherein both solvents belong to one of the solvent groups listed below:

organohalogen solvents: dichloromethane, chloroform,
ketones: acetone, methyl ethyl ketone,
ethers: dimethyl ether, diethyl ether, dipropyl ether, polyether, glycol ether, tetrahydrofuran, dioxane,
esters: carboxylic acid esters such as methyl acetate, ethyl acetate, butyl acetate, gamma-butyrolactone, cyclohexanol acetate,
alcohols: methanol, ethanol, propanol, butanol, hexanol and aromatics: benzene, xylene, toluene, ethylbenzene,
deep eutectic solvents (DES) based on quaternary ammonium compounds and hydrogen bond donors:
   choline chloride/urea; choline acetate/urea; tetrabutylammoniumchloride/oxalic acid; cholinechloride/glycol.

However, particularly advantageous is the use of a single solvent or of two solvents from the same solvent group, since in this way the downstream drying and recovery process can be performed very efficiently and adapted to the system. The use of a single solvent or of two solvents from the same solvent group furthermore offers the advantage of being able to produce a permanently stable and very homogeneous coating solution with a precisely defined viscosity. As a result, the actual coating process can then also be performed with high quality and reproducibility.

The investigations in the development of the multifunctional coating have shown that in the long-term bonding or adhesion between acrylate copolymers and cellulose triacetate is usually unsatisfactory. Only very few materials are suitable as acrylate-copolymers due to the poor adhesion properties to the CTA surface, wherein in particular acrylate copolymers having a high glass transition temperature of more than 80° C. are problematic. Usually (see U.S. Pat. No. 4,852,262 A), various copolymers having different glass transition temperatures are therefore combined with each other, which, however, may cause optical problems such as streaking or also adhesion problems during re-dissolution of the coating and renewed solidification.

In the preferred embodiment of the multifunctional coating, the combination of different acrylate copolymers has been dispensed with and instead, as an essential feature of the invention, a combination of a single acrylate copolymer and a cellulose derivative was used, which has significantly better adhesion properties and good thermal resistance.

Suitable acrylate copolymers for this purpose are polymers from the following groups:
   methyl methacrylate copolymers: for example Elvacite 2669, 2823, 2927, 2552C (Lucite International Inc., Cordova, USA), Paraloid B44, A14, A101 (Rohm and Haas/Dow Chemical Company, USA),
   Ethyl acrylate or ethyl methacrylate copolymers: for example Elvacite 2042, 2043 (Lucite International Inc., Cordova, USA), Paraloid B 66, B 72, B 82 (Rohm and Haas/Dow Chemical Company, USA), Optema TC 110 (Exxon Mobil Chemical, Houston, USA),
   butyl acrylate or butylmethyl acrylate copolymers: for example Elvacite 2044, 2045, 2776, 2823, 4028 (Lucite International Inc., Cordova, USA), Paraloid B48N, B48S, B66, B67, B99 (Rohm and Haas/Dow Chemical Company, USA), Neocryl B723 (DSM Coating Resins BV, Zwolle, Netherlands).

The cellulose derivative component can be selected from the following classes of substances:
   cellulose acetate: for example, cellulose acetate from the company Celanese (Sulzbach, Germany), Eastman™ cellulose acetate (CA-398-x) (Kingsport, USA).
   cellulose acetate butyrate: for example, Eastman™ cellulose acetate butyrate (CAB-381-x, CAB 551-x) (Kingsport, USA), Sigma-Aldrich cellulose acetate butyrate (Saint Luis, USA),
   cellulose acetate propionate: for example, Eastman™ cellulose acetate propionates (CAP-482-x); Sigma-Aldrich cellulose acetate propionate (Saint Luis, USA),
   cellulose triacetate: for example, Eastman™ cellulose triacetate (CA-436-80S),
   methylcellulose: for example, METHOCEL methyl celluloses (DOW Chemical Company, USA),
   ethylcellulose: for example ethylcellulose ET 200 (Kremer Pigmente, Aichstetten, Germany), Dow ETHOCEL ethyl celluloses (DOW Chemical Company, USA),
   hydroxypropyl cellulose: for example, Klucel™ (Ashland Specialty Ingredients, Wilmington, USA); Hydroxypropyl cellulose MW 370,000 (Sigma-Aldrich, Saint Luis, USA).

Depending on the particular combination of the components selected from $a_1$) to $a_4$) and $b_1$) to $b_4$) and by using a specially adapted coating and drying process, the basic version provides highly transparent coated cellulose triacetate films having the following properties:
   film thickness: 40 µm to 350 µm,
   coating layer thickness: 0.5 µm to 100 µm,
   very low haze value of <0.5%, based on a film thickness of 120 µm and a coating thickness of 20 µm,
   very high transparency, characterized by an average transmission value in the range 380 nm-780 nm of the 20 µm coated, but not colored 120 µm film of >89%, measured with a Hitachi U-3010 Spectrophotometer,
   nearly identical refractive indices of the film substrate and the coating
   very good storage and transportability as rolled goods or as cut film layers at temperatures <40° C. and relative humidity <60%, characterized by the following properties of the unwound film roll or separate individual layers after 7 days:
      fraction of bonded areas that can be separated from each only with a mechanical effort >10 N: <0.1%,
      area fraction of flakes outside the film edge area of 2 mm: <0.1%,
      fraction of visibly deformed areas: <0.1%,
      fraction of changes in the surface that have additionally occurred after storage, such as cloudy spots on the coating side and on the opposite film side: <1%,
   outstanding long-term stability of the employed individual components and consequently also of the coated CTA films, characterized by a rate of change of the haze values, the transmission values and the adhesion stability between substrate and coating of <5%/1000 h,
   rapid dissolvability of the coating within a maximum of 5 sec by minor dropwise addition of <25 mg/cm² of an organic solvent such as dichloromethane, ethanol, acetone, MEK, toluene, xylene, ethylbenzene, methoxy propanol, methyl acetate, ethyl acetate, butyl acetate and thereafter good adhesiveness and permanent adhesion to flat surfaces based on the following materials:

glass, for example window glass, microscope slide glass, cellulose derivative films, for example cellulose triacetate film, wood or wood-based material, for example fine chipboard, cardboard, paper, for example photo paper 240 g/m².

metals, for example stainless steel sheet, aluminum sheet, copper sheet, ceramic, to the example glass ceramic tiles, good adhesion to surfaces by brief areal application of thermal energy until warming up to a maximum temperature of 150° C., retention of the transparency, of the refractive indices, of the haze values and of the adhesion to the cellulose triacetate support film even after bonding, good re-detachability either by applying a force after lifting a film edge and/or by using solvents such as ethanol or acetone.

According to one particularly preferred embodiment of the invention, the coating solution contains a maximum of two solvents from just one solvent group, an acrylate copolymer, a cellulose derivative and a plasticizer, resulting in the following properties for the cellulose triacetate films coated with a layer thickness from 5 μm to 35 μm and having a total thickness from 120 μm to 270 μm:

high transparency, characterized by a haze value smaller than 0.3% transmission in the visual range (380 nm to 780 nm): average>89% residual solvent content: <2.0% good adhesion to glass microscopy slides, i.e. with small amounts of solvent<25 mg/cm² which are distributed in drop-shaped form, a stable attachment of film material on the glass microscopy slides can be reached within 5 seconds, after bonding to the slide carrier, no formation of streak-like microstructures that are identifiable under the microscope at 40× to 400× magnification, after bonding to the slide carrier, no formation of inhomogeneities that are identifiable under the microscope, very narrow edge spalling zone of <1 mm at the cutting edge, good temperature- and storage stability of the rolled goods when stored for 7 days at <40° C., i.e. no identifiable adhesion or peeling of the coating after unrolling, good mechanical and/or thermally-supported shaping of the coating surface for better distribution of the solvent drops before bonding and for improving detection in the film machine, high dimensional stability of the shaped structure even after 7 day storage of the rolled goods at 35° C., i.e. reduction of the height of the shaped structure by maximally 30% while maintaining of the stray light and distribution properties, optional applicability of alternative solvents, for example selected alcohols, ethers or esters, rather than the usually used aromatic solvents like xylene, ethylbenzene or toluene, without causing a gradual formation of microstructures, streaks and inhomogeneities, good long-term stability of the optical properties and of the adhesion properties after bonding on the glass microscopy slides in a storage test lasting 3 months, a storage temperature of 23° C. and a relative humidity of 50%, rise (curl) of the film edges from of the support surface<5 mm of the film sections taken from the single roll and having a length of 50 mm and a width of 24 mm, layer thickness deviation from the mean: <3% measured linearly over a length of 3 m.

By additional application of one or more hard coat layers on the film substrate according to point $a_3$) and/or by using different functional additives according to point $a_4$), cellulose triacetate films provided with an adhesive coating and having the following extended application properties can be obtained:

improved protection against mechanical damage, scratching or attack from solvents, characterized by a pencil hardness value of >1H, measured with No. 553-M Film Hardness Tester, step-down transformer, 45° angle, 500 gram weight, rounded Mitsubishi pencil lead; 23° C., 55% relative humidity and a steel wool test score of 0, as measured with a YT-520 Eyeglass Surface Hardness Tester with a weight from 300 gram, 12 cycles; 23° C., 55% relative humidity, and/or improved UV protection by using UV absorbers in the film matrix and/or in the coating matrix, characterized by a transmission at 380 nm<3% and at 400 nm<10%, and/or improved IR protection and thermal radiation absorption by using IR absorbers in the film matrix and/or in the coating matrix, characterized by a transmission at 900 nm<15% and at 1200 nm<20%, and/or improved electrical conductivity accuracy or electrostatic discharge capability by using electrically conductive polymers, nanoscale conductive additives, deep eutectic solvents (DES) or by using metal particles in the film matrix and/or in the coating matrix, targeted adjustable color by using light-absorbing or light-reflecting materials in the film matrix and/or in the coating matrix, characterized by the following color values according to CIE-Lab 1976; 10°; D 65:

L 30 to 90, a: −100 to +100 b: −150 to +150.

The novel highly transparent cellulose triacetate films provided with an adhesion-promoting and protective multifunctional coating may be employed in the following applications:

stick-on and reversibly removable functional window films with UV- and IR protective function, intentionally adjustable colors and scratchproof surface, stick-on or thermo-laminatable functional protective furniture films or furniture films with intentionally adjustable colors and scratch resistance as an alternative to sprayed-on high gloss lacquer surfaces, stick-on cover films to be bonded on glass microscopy slides for one-time application or with coverslipping machines, as an alternatively material to coated glass microscopy slides or glass cover slides for microscopic applications, as fixation and preserving films to long-term storage of flat or two-dimensional thin objects <50 μm layer thickness, which require long-term optical accessibility for microscopic investigations, for example tissue samples, hair samples, paper samples, as a component in lenses for sunglasses or in light protective shields.

Surprisingly, it has been observed during the investigations of the applicability and use of the novel coated highly transparent cellulose triacetate films, that these especially exemplify a very good fit as cover film for use with film coverslipping machines or as an alternative film for the typically employed coated glass microscopy slides or coated cover glasses, wherein it has been proven to be advantageous due to the high transparency to provide the surface of the coating with a geometrically precisely defined surface structure that can be reversibly removed by application of heat or solvent treatment for subsequent detection with scattered light sensors frequently used in the machines.

The surface structure may have a pattern including honeycombs, diamonds rhomboids, squares, triangles, circles or sinusoidal arcs, wherein preferably the respective basic structure has a size from 5 to 500 μm. This defined surface structure serves also to enable improved wetting and to better distribute the dropwise applied solvents.

The surface structure is preferably applied by an embossing process with the help of a precision roller having a patterned surface in conjunction with application of mechanical and thermal energy.

The novel coated cellulose triacetate films are distinguished from the already existing cover film products by the combination following properties:

- excellent transparency, characterized by a haze value less than 0.3%
- very high transmission in the visible range (380 nm to 780 nm)>89% on the average,
- low residual solvent content of <2.0%,
- very good and fast adhesion on glass microscopy slides, i.e. a stable adhesion of the film material on the glass microscopy slides can already be attained within 5 seconds with small amounts of solvent of <25 mg/cm$^2$ (dropwise distribution),
- after bonding onto the slide carrier, no short-term and long-term formation of microstructures that are recognizable under microscopic examination at 40× to 400× magnification,
- no formation of streaks or microscopically recognizable inhomogeneities after bonding onto the slide carrier,
- very narrow edge spading zone at the cutting edge, i.e. <1 mm,
- good temperature- and storage stability of the rolled goods when stored at 35° C. for about 7 days, i.e. no recognizable adhesions or peeling of the coating after unrolling,
- good mechanical and/or thermally supported embossing capability of the coating surface for improved distribution of the solvent drops before bonding on and for improved detection in the film machines,
- high dimensional stability of the embossed structure even after storage of the rolled goods for 7 days at 35° C., i.e. height reduction of the embossed structure by maximally 30% while maintaining of the scattered light properties,
- easy removability or reduction of the applied embossed structure by application of organic solvents and/or heat,
- excellent long-term stability of the optical properties and the adhesion properties after bonding onto the slide carrier at a storage temperature of 23° C. and a relative humidity of 50%,
- excellent dimensional stability of the film sections removed of the single roll having a length of 50 mm and a width of 24 mm, i.e. the rise of the film edges from of the support surface is <5 mm,
- excellent thickness consistency of the support film and the coating, i.e. when measured linearly over a length of 3 m, the mean deviation of the total thickness of the composite is <3%.

One or several of the highly transparent films according to the invention can be used as a window film capable of adhering to glass, wood, metal, ceramics, cellulose derivative films or plastics after dissolution or thermal treatment, a film for sunglasses, a film for laminates, a furniture film, a cover film, a slide carrier film for microscopy, a cover glass replacement film and/or a protective film. In view of the profile of the above listed properties, the main application of the present invention lies in the use of the novel cellulose triacetate films provided with an adhesion-promoting multifunctional coating as a cover film and/or a slide film and/or a cover glass film in the field of microscopy.

Moreover, it has been surprisingly found in the context of the application tests, that as solvents for the cover medium not only the xylenes, xylene/ethylbenzene mixtures or xylene toluene mixtures used mostly in the histology can be used, but that excellent optical properties can also be attained by using alternative, less toxic or environmentally hazardous solvents such as selected ethers, esters or alcohols. In contrast to other commercial cover films, the use of these alternative, less toxic solvents and solvent mixtures does not cause a gradual formation of microstructures, streaks and inhomogeneities or spalling of the coating from of the support film in the long-term, i.e. within 2-4 weeks after covering.

When evaluating extensive test series, fewer toxic solvents were identified compared to xylene, toluene or ethylbenzene which are well suited for the bonding the novel coated cellulose triacetate films on glass, metal, wood and some plastics.

Based on these test results, a dissolver medium has at last been developed which is also suitable for the application in the field of microscopy for dissolving the cover medium or the coating layer of the cover film and which in one special variant is usable at an appropriate solids concentration even as cover medium.

This dissolver medium includes the following components:

- one or more carboxylic acid esters that are less toxic compared to toluene, ethylbenzene or xylene, such as to the example methyl ester acetate, ethyl ester acetate, propyl ester acetate, butyl ester acetate, dimethyl ester carbonate, ethyl ester lactate,
- and/or one or more ethers that are less toxic compared to toluene, ethylbenzene or xylene, preferably from the group of the glycol ethers, for example diethylene glycol monoethyl ether, diethylene glycol monobutyl ether, propylene glycol 1-methyl ether, dipropylene glycol methyl ether and/or from the group of the alkyl phenyl ethers, for example methyl phenyl ether,
- one or more in the comparison to toluene, ethylbenzene or xylene fewer toxic alcohols, prefers ethanol, isopropanol and/or butanol and
- an acrylate copolymer, preferably from the substance class of the acrylate copolymer used in the coating.

A special characteristic of this novel solvent mixture for applications in coverslipper machines or for covering microscopic samples is the use an acrylate copolymer which belongs to substance class of acrylate copolymer used in the coating and should perform the following functions:

- adjusting the optimum viscosity for the exact dosing in the dropwise application of the solvent mixture on the cover medium, without causing unnecessary discharge or leakage from excess low-viscosity liquid solvent out of the edge areas and thus severe contamination of the coverslipper machine, adjusting an optimum combination of the layer thickness of the coating necessary for covering the sample and of the necessary amount of solvent necessary for dissolving the coating, sustainable improvement of the adhesion to the glass surface and the sample to be covered, provided that the dissolver medium is applied dropwise directly on the glass immediate before bonding, adjustability of the dissolution speed in dependence of the amount of the acrylate copolymer used, reduction or prevention of the formation of streaks or structural imperfections, which develop during the gradual evaporation of solvent from the edge regions areas and are attributable to different refractive indices of the coating components and of the employed solvents, and formation of a preserving, successively solidifying cover layer when using the dissolver medium as a cover medium.

A comparison of microscopic images of hair samples covered by using xylene and obtained with 100× enlargement with hair samples covered by using the novel solvent mixture shows an improved depth of field and higher resolution of interfaces at the boundary surfaces of the latter samples.

Furthermore, in the direct comparison, a faster solidification of the cover medium initially dissolved with the new solvent mixture was detected, i.e. the covered samples were more quickly mechanically fixed in place. The solidification time in the region of the hair was between 40 and 48 hours when using xylene and between 24 and 36 hours when using the novel solvent mixture.

A number of economic, ecological and qualitative benefits are derived by the coated films according to the invention both for the manufacturer of the films as well as for the processing companies and for the end customer.

Since the coated highly transparent films have a very homogeneously property profile, they can be easily combined in conjunction with further processing to form, for example, laminates for protective visors, sunglasses, window films, etc., without causing light refraction effects, diffraction phenomena or annoying optical inhomogeneities in the bonding areas caused by the addition of tolerance values. The haze value of the produced composite film products can thereby be kept significantly smaller, i.e. significantly below 1%. An important advantage is the multiple bondability of the films both by using different solvents and by applying thermal energy without having to use solvents at all.

With the preferred use of the coated films as cover films, it is possible to not use only individual sections having the dimensions of an slide carrier, but also to wind the film on a machine-suitable narrow single roll or to cut the coated master roll accordingly. These narrow single rolls may have a length of up to 500 m by virtue of the low thickness tolerance and the defined spacing and adhesion due to the applied surface structure, without causing the wrapping to break loose or causing inhomogeneities. The temperature stability (40° C. for a maximum of 24 hours) allows in many regions of the world the rolls to be shipped to the end customer, without requiring as presently refrigerated transport to ensure transport temperatures≤25° C.

By virtue of being able to use non-aromatic or at least toxicologically less objectionable solvents or solvent mixtures both in the manufacturing process and at the end customer, the toxicological risk potential both for the production staff as well as for the employees in the installation area of the microscopes and coverslipper machines can be substantially reduced. The minor outgassing from aromatic solvent compounds frequently observed with comparative products long after the manufacturing or covering process does no longer occur here.

Re-detachment of the cover films from the slide carrier does no longer require the use of highly flammable solvents acetone or methyl ethyl ketone; instead, the detachment can take place either after a short exposure to alternative solvents, for example ethanol, as well as after brief heating to about 60° C., provided this is permissible for the sample.

The amount of solvent required for the at least initial dissolution of the adhesive layer may be reduced by the impressing on the coating a defined distribution structure, without impairing the bondability. This can also be viewed as an ecological advantage by virtue of the conservation of resources.

When using corresponding suitable additives, coated colored CTA films and/or coated CTA films with IR or UV protection can be obtained. These are suitable, after the application of an outer scratchproof layer, as window film as well as furniture film and can be bonded directly on the respective surface either thermally or with the aid of small amounts of solvents. Because the bond has long-term stability while still being reversibly removable, the CTA films can be removed from support material in the event of damage or when the use requirements change, without destroying or damaging the support material.

Further details, features and advantages of embodiments of the invention can be appreciated from the following description of exemplary embodiments.

DETAILED DESCRIPTION OF PREFERRED EMBODIMENTS

Exemplary Embodiment 1

Multifunctional Coated Colored Cellulose Triacetate Film with Improved Bondability to Surfaces Made of Glass, Wood and Metals A film with a layer thickness of 80 μm, consisting of a cellulose triacetate with a lowest possible haze value ≤0.4%, a plasticizer (triphenyl phosphate) in a concentration of ≤12% and dye additives (for example Orasolrot 395 from the company Kremer Pigments) in a concentration <1% is coated as follows:

Preparing a 10% cellulose derivative solution consisting of 10% cellulose acetate propionate, dissolved in a mixture of 39% acetone and 1% methyl ethyl ketone and 60% methyl acetate and thereafter applying the solution with a doctor blade with a wet film thickness of max. 20 μm on the 80 μm-CTA film, followed by intensive convective drying for fastest possible removal of the solvent, Preparing a coating solution consisting of the following components which are together stirred and homogenized at a temperature of 30° C. for at least 12 hours:
75 mass % solvent mixture, consisting of 45% Toluene, 40% methoxypropanol. 15% dichloromethane,
22 mass % acrylate copolymer mixture, consisting out 75% Paraloid B48N and 25% Paraloid B72,
1.5 mass % cellulose acetate propionate (CAP),
1.5 mass % plasticizer mixture, consisting of 80% triphenyl phosphate (TPP) and 20% tris(2-chloroethyl) phosphate (TCEP).

At the end of the stirring time, the coating solution is applied on the primary coated side of the CTA film with a doctor blade to a wet film thickness of about 30 µm and subsequently intensively dried at temperatures of at least 120° C. for 20 min.

The so produced highly transparent coated colored CTA films can now be bonded onto a glass surface, a wood surface or a metal surface by initially dissolving the coating with acetone or toluene and applying a window film doctor blade, without causing the film to detach from of the surface independently. The multifunctional coating enables also the application of thermal energy for bonding the film, i.e. a permanent and yet reversibly releasable adhesion of the CTA film can already be realized by briefly placing an iron or a similar heating unit followed by briefly pressing the film onto the surface.

In contrast to an uncoated colored CTA film, the adhesion on the above-mentioned surfaces is significantly improved while retaining the high transparency of the starting material.

EXEMPLARY EMBODIMENT 2

Multifunctional Coated Cellulose Triacetate Film for Application as a Cover Film in the Field of Microscopy A highly transparent film (haze value<0.5%) with one layer thickness in the range from 120 to 130 µm, consisting of cellulose triacetate and a plasticizer (triphenyl phosphate) in a concentration of ≤12% is coated as follows:
Preparing a coating solution consisting of the following components which are stirred together and homogenized at a temperature of 30° C. for at least 8 hours:
70 mass % solvent mixture, consisting of 75% ethyl acetate and 25% methoxypropanol,
22 mass % acrylate copolymer mixture consisting of 50% Paraloid B99 and 50% Paraloid B72,
1.5 mass % cellulose acetate propionate (CAP),
1.5 mass % cellulose acetate butyrate (CAB),
5 mass % plasticizer mixture, consisting of 50% diethyl phthalate and 50% diisononyl phthalate.

At the end of the stirring time, the coating solution is applied onto the CTA film with a doctor blade with a wet film thickness of about 65 µm and subsequently intensively dried at 125° C. for 45 min.

It was found to be advantageous to apply in this context a 3D surface structure on the coated side of the film—for example by using several pressure rollers with a defined roughness and/or surface geometry.

The so produced coated CTA films can now be cut to the required size for application as a cover film—for example as a single cut 50 mm×24 mm or as a roll 75 m×24 mm. These assembled cover films can be stored and transported at a temperature from 5° C.-35° C. for at least 12 weeks, without degrading the product.

The coating can be dissolved by dropwise applying 3-5 drops xylene or ethylbenzene from a 5 ml disposable pipette onto the coated side and the film can then be immediately bonded on a microscope slide, on which the microscopy object has already been placed. The use of a rubberized roll as pressure roll for affixing the film uniformly on the glass slide is hereby recommended.

The objects can subsequently be immediately examined microscopically, wherein no interference of the observation matrix occurs due to the high transparency of the CTA film and the coating.

Long-term preservation of the covered objects for at least 12 weeks can be attained by storing these covered slides at a temperature of 20° C. to 25° C. and a relative humidity from of about 50%, without optically detectable degradation of the object undergoing microscopic examination.

Even after a storage time of several months the film can be detached again very quickly from the slide by briefly inserting the covered slide in acetone (for about 30 seconds). The object to be examined is then again available for further investigations.

A comparison with current commercially available cover films from different manufacturers has demonstrated that coated CTA films produced in accordance with this exemplary embodiment have comparable application and storage properties which appear to make feasible the use of the cover film in the field of microscopy and with coverslipper machines.

What is claimed is:
1. A highly transparent coated film based on cellulose triacetate consisting of a support film and a coating layer,
a) the support film comprising:
$a_1$) a cellulose triacetate with a haze value of <0.5% and further defined by:
a content of gel-forming components of ≤0.5%,
cotton linters as raw material base,
a water content of <1%,
a proportion of free acetic add of ≤300 ppm,
a very slight yellow coloration, characterized by a low Hazen color number (APHA value) <70 determined on a 16% solution of cellulose triacetate, dissolved in methylene chloride according to the ASTM D-1209 method and,
a proportion of <0.5% of foreign fibers and particles having a size of ≤5.40 µm,
$a_2$) at least one organic or inorganic substance, which is effective as bonding agent and spacer between the molecular chains of the cellulose triacetate and acts as a plasticizer to promote flexibility and elasticity of the support film,
$a_3$) a surface layer disposed on one side or both sides of the support film and based on a cellulose ester mixture or a cellulose ester mixture that is fully dissolved or initially dissolved in halogen alkanes, ketones, ethers, esters, deep eutectic solvents or alcohols and/or an acrylate mixture which is crosslinkable with UV light, chemically or by supplying thermal energy,
$a_4$) functional additives from the following groups in a proportion between 0.001 mass % and 15 mass %:
organic or inorganic substances with a transmission-influencing absorptive function in the wavelength range of 300 nm to 2,500 nm, microscale or nanoscale additives for adhesion, slip or electrostatic properties,
crosslinking agents,
stabilizers and/or antioxidants,
b) the coating layer applied by a coating solution comprising,
$b_1$) at least two solvents selected from the group consisting of ethers, esters, ketones, aromatics and deep eutectic solvents (DES)
$b_2$) at least one acrylate copolymer with an average molecular weight $M_w$ between 100,000 and 150,000 g/mole, a glass transition temperature of at least 35° C. and a solubility or swellability in at least one solvent,
$b_3$) at least one cellulose derivative with a solubility of at least 10 g/liter in a solvent selected from the group consisting of ketones, ethers, deep eutectic solvents and alcohols, and b4) one or more plasticizers in an amount between 0.01% by mass and 15% by mass.

2. The highly transparent film according to claim 1, wherein the one or more plasticizers according to b4) are selected from the group consisting of phosphoric acid esters, phthalic acid esters, carboxylic add esters, glycols, deep eutectic solvents and polyesters and having a boiling point greater than 60° C.

3. The highly transparent film according to claim 2, wherein the at least one cellulose derivative are one or more selected from the group consisting of cellulose acetate (CA), cellulose diacetate (CDA), cellulose triacetate (CTA) cellulose acetate butyrate (CAB) cellulose acetate propionate (CAP) methyl cellulose (MC), ethyl cellulose (EC) and hydroxypropyl cellulose (HPC).

4. The highly transparent film according to claim 1, wherein the coating solution comprises the at least two solvents of b1 which dissolve the at least one acrylate copolymer and also initially dissolves or swells the cellulose triacetate used for the support film and has a boiling point greater than 35° C.

5. The highly transparent film according to claim 1, wherein the at least one acrylate copolymer of the coating solution are selected from the group consisting of methyl methacrylate copolymers, ethyl acrylate copolymers, ethylmethacrylate copolymers, butyl acrylate copolymers and butylmethacrylate copolymers.

6. The highly transparent film according to claim 5, wherein the coating layer is a multifunctional coating based on the coating solution which contains, the one or more plasticizers as maximally two plasticizers selected from the group consisting of phosphoric acid esters, phthalic add esters, carboxylic add esters, glycols, deep eutectic solvents and polyesters and having a boiling point greater than 60° C., the at least one cellulose derivative as maximally two cellulose derivatives selected from the group consisting of cellulose acetate, cellulose diacetate, cellulose triacetate cellulose acetate butyrate cellulose acetate propionate methyl cellulose, ethyl cellulose and hydroxypropyl cellulose, the at least two solvents of b1 which dissolves the at least one acrylate copolymer and also initially dissolves or swells the cellulose triacetate used for the support film and has a boiling point greater than 35° C. and the at least one acrylate copolymer as maximally two acrylate copolymers selected from the group consisting of methyl methacrylate copolymers, ethyl acrylate copolymers, ethylmethacrylate copolymers, butyl acrylate copolymers and butylmethacrylate copolymers.

7. The highly transparent films according to claim 6, wherein the thickness of the support film is 40 μm to 350 μm, and the dry thickness of the coating layer is between 0.5 μm to 100 μm.

8. The highly transparent film according to claim 7, wherein the multifunctional coating is obtained based on the coating solution, which contains:

the one or more plasticizers being only one plasticizer selected from the group consisting of phosphoric add esters, phthalic add esters, carboxylic add esters, glycols, deep eutectic solvents and/or polyesters and having a boiling point greater than 60° C., the at least one cellulose derivative being only one cellulose derivative selected from the group consisting of cellulose acetate, cellulose diacetate, cellulose triacetate cellulose acetate butyrate cellulose acetate propionate methyl cellulose, ethyl cellulose and hydroxypropyl cellulose, the at least two solvents of b1 being only two solvents which dissolves the acrylate copolymer used for the coating and also initially dissolves or swells the cellulose triacetate used for the support film and has a boiling point greater than 35° C., the at least one acrylate copolymer being only one acrylate copolymer selected from the group consisting of methyl methacrylate copolymers, ethyl acrylate copolymers, ethylmethacrylate copolymers, butyl acrylate copolymers and butylmethacrylate copolymers.

9. The highly transparent film according to claim 8, wherein the coating layer has a dry film thickness of 5 μm to 35 μm, and the highly transparent film has a total thickness in a range from 120 μm to 270 μm.

10. The highly transparent film according to claim 9, wherein the coating layer has a defined surface structure, embossed with two-dimensionally repeating geometric patterns of hexagonal honeycombs, rhomboids, diamonds, squares, rectangles, circles, sinusoidal circular arcs and/or triangles with an inner diameter or pitch of 10 μm to 500 μm, a ridge height of the lines of 2 μm to 15 μm, and a ridge width of 1 μm to 200 μm.

11. The highly transparent film according to claim 1, wherein the alcohols of b1 are selected from the group consisting of methanol, ethanol, propanol butanol and hexanol; wherein the ethers b1 are selected from the group consisting of dimethyl ether, diethyl ether, dipropyl ether, polyether, glycol ether, tetrahydrofuran and dioxane; wherein the esters of b1 are selected from the group consisting of carboxylic esters, methyl acetate, ethyl acetate, propyl acetate, butyl acetate, gamma-butyrolactone, gamma-valerolactone, carbonic add dimethyl ester, ethyl lactate and cyclohexanol acetate; wherein the ketones of b1 are selected from the group of acetone, methyl ethyl ketone butyl and methyl ketone; wherein the aromatics of b1 are selected from the group consisting of benzene, toluene, xylene and ethylbenzene; wherein the deep eutectic solvents of b1 are selected from the group consisting of choline chloride/urea; choline acetate/urea; tetrabutylammonium chloride/oxalic acid and choline chloride/glycol.

12. A method of using one more of the highly transparent coated film according to claim 1, as a window film, sunglasses film, laminating film, furniture film, cover film, slide film for microscopy, cover glass replacement film and/or protective film capable of bonding to glass, wood, metal, ceramics, cellulose derivative films or plastics after dissolution or thermal treatment.

* * * * *